March 17, 1970   M. R. ERICKSON ET AL   3,500,937
DISK MEANS FOR A FERTILIZER APPLICATOR IMPLEMENT
Filed April 3, 1967

INVENTORS
MARTIN R. ERICKSON
LAWRENCE P. BRINCKS
BY
Zarley, McKee & Thomte
ATTORNEYS United States Patent Office 3,500,937
Patented Mar. 17, 1970

3,500,937
DISK MEANS FOR A FERTILIZER
APPLICATOR IMPLEMENT
Martin R. Erickson and Lawrence P. Brincks, both of
Auburn, Iowa 51433
Filed Apr. 3, 1967, Ser. No. 627,712
Int. Cl. A01b 23/06, 35/28; A01c 5/06
U.S. Cl. 172—600                                      3 Claims

ABSTRACT OF THE DISCLOSURE

A disk means for a fertilizer applicator implement comprising, a pair of spaced apart disks rotatably mounted on a support means adapted to train behind a fertilizer applicator to cover the fertilizer to prevent its escape from the ground.

---

Fertilizer is frequently applied to a field in a liquid form by means of a fertilizer knife or the like. The knife penetrates the ground and the liquid fertilizer such as nitrogen or the like is injected into the ground usually at a point rearwardly of the knife. If the fertilizer is not covered with dirt, the fertilizer will evaporate and its fertilizing qualities will therefore be lost.

Therefore, it is a principal object of this invention to provide a disk means for a fertilizer implement which prevents the fertilizer from escaping from the ground.

A further object of this invention is to provide a disk means for a fertilizer applicator implement which prevents the liquid fertilizer from evaporating.

A further object of this invention is to provide a disk means for a fertilizer applicator implement having a pair of rotatable disks adjustably mounted on a support means which is adapted to trail behind the fertilizer knife.

A further object of this invention is to provide a disk means for a fertilizer applicator implement including a pair of rotatable disks, the disks being provided with a bearing means which is trouble-free.

A further object of this invention is to provide a disk means for a fertilizer applicator implement having a disk means pivotally secured to a support means which is adapted to trail behind a fertilizer knife.

A further object of this invention is to provide a disk means for a fertilizer applicator implement which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 6 is an enlarged sectional view as would be seen on line 6—6 of FIG. 1.

Figure 1:
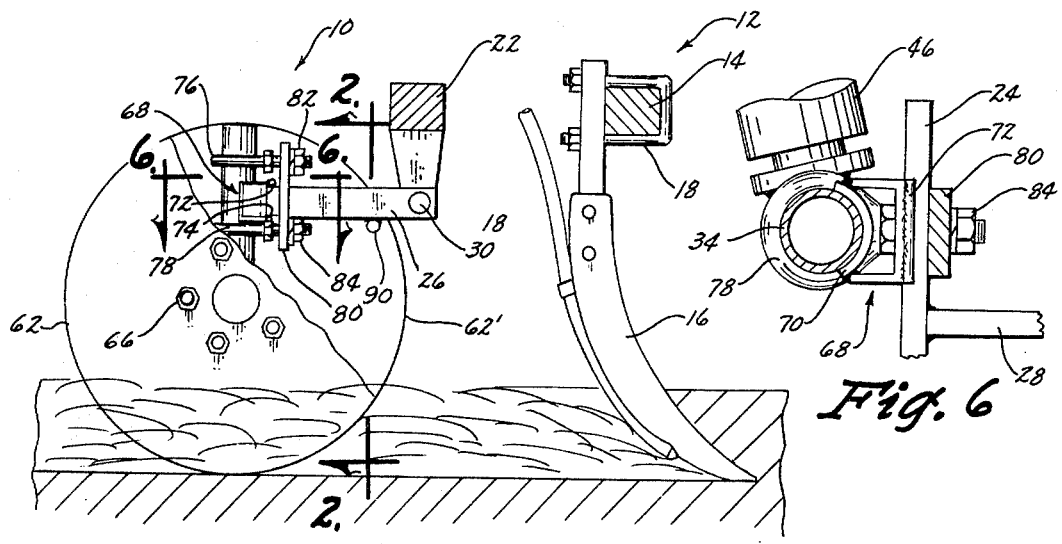
FIG. 1 is a side view of the disk means trailing a fertilizer knife with portions thereof cut away to more fully illustrate the invention.

The numeral 10 generally designates the disk means which is adapted to trail behind the fertilizer applicator implement 12. Implement 12 consists of a supporting bar 14 having a fertilizer knife 16 detachably secured thereto by any convenient means such as a U-bolt 18. A fertilizer conduit 18 extends from a storage tank of fertilizer (not shown) and extends downwardly behind the knife 16. Implement 12 does not form a portion of this invention but is shown merely for purposes of illustration inasmuch as the design of the implement 12 will vary from manufacturer to manufacturer.

Figure 2:
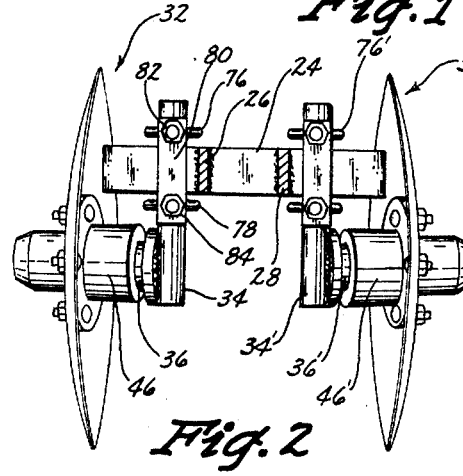
FIG. 2 is a sectional view of the disk means as would be seen on line 2—2 of FIG. 1.
Figure 4:
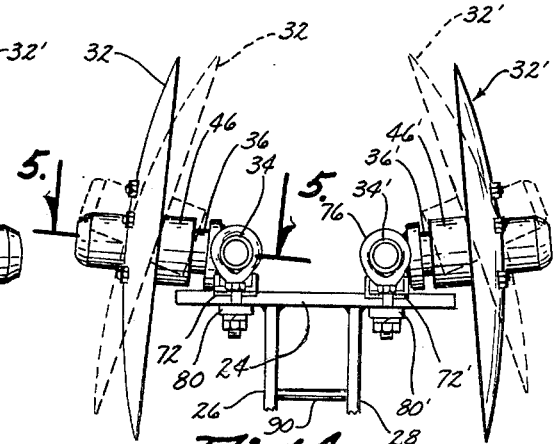
FIG. 4 is a view similar to FIG. 3 except that the disk spindle means is secured rearwardly of the transverse bar member, the broken lines indicating the selective pivotal movement of the disk members.
Figure 5:
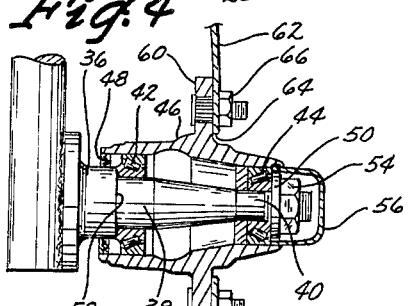
FIG. 5 is an enlarged sectional view of the spindle means as seen on line 5—5 of FIG. 4.

The numeral 22 designates a frame member which would ordinarily be interconnected to the implement 12 by any suitable means. Disk means 10 is comprised of a transverse bar member 24 having a pair of spaced apart bar members 26 and 28 secured thereto and extending forwardly therefrom. The forward ends of bars 26 and 28 are provided with suitable openings formed therein to permit the pivotal attachment thereof to frame member 22 by means of a pin 30 extending therethrough. A disk spindle assembly 32 is adjustably secured to one end of bar 24 while a disk spindle means 32' is adjustably secured to the other end of bar 24 as illustrated in FIGS. 2 and 4. Inasmuch as disk spindle assemblies 32 and 32' are identical, only disk spindle assembly 32 will be described for purposes of brevity while the suffix ' will be used to indicate identical structure on disk spindle means 32'. The numeral 34 designates a vertically disposed pipe having a spindle 36 secured to the lower end thereof by welding or the like and which extends horizontally outwardly therefrom. Spindle 36 is provided with bearing surfaces 38 and 40 adjacent opposite ends thereof which are adapted to receive bearings 42 and 44 thereon respectively. A hub 46 is rotatably mounted on spindle 36 and has a seal means 48 positioned at one end thereof which embraces spindle 36 to seal the interior of hub 46 to prevent dust or dirt from entering the same. A washer 50 embraces the outer end of spindle 36 and engages bearing 44 to limit the outward movement of bearing 44 with respect to spindle 36. A nut 54 is threadably mounted on the outer end of spindle 36 to maintain hub 46 on spindle 36. A dust cap 56 extends over the outer end of spindle 36 and nut 50 and frictionally engages the outer end of hub 46 to prevent dust or dirt from entering the bearing 44. As seen in FIG. 5, bearing 42 engages shoulder 58 on spindle 36 and bearing 42 engages the interior of hub 46 to limit the longitudinal movement of hub 46 with respect to spindle 36. Hub 46 is provided with a flange 60 extending radially outwardly therefrom as best seen in FIG. 5. A disk member 62 having a central opening 64 embraces hub 46 and is detachably secured to flange 60 by a plurality of bolts 66.

The numeral 68 generally designates an elongated channel member having an elongated pipe segment 70 welded thereto in the manner best seen in FIG. 6. The upper end of channel member 68 is provided with a lip portion 72 secured thereto which is adapted to extend above the upper portion of bar 24 to limit the downward movement of channel member 68 with respect to bar 24. Channel member 68 is also provided with a lip portion 74 which is secured to the lower end thereof and which extends horizontally therefrom beneath the lower end of bar 24 to limit the upper movement of channel member 68 with respect to bar 24. As seen in FIG. 6, pipe 34 is received by pipe segment 70 and is maintained therein by a pair of eye bolts 76 and 78 which embrace pipe 34 nd which extend horizontally therefrom above and below ar 24 respectively. A plate member 80 is received by he free ends of eye bolts 76 and 78 so that bar 24 is ositioned between channel member 68 and plate 80 and s maintained therein by nuts 82 and 84 which are threadbly secured to eye bolts 76 and 78 respectively. It can be een that the angular relationship between disk spindle ssembly 32 and bar 24 may be changed by simply oosening nuts 82 and 84 to permit the rotation of pipe 4 with respect to channel member 68 and segment 70. ikewise, pipe 34 can be vertically adjustably moved vith respect to channel member 68 and pipe segment 70.

Figure 3:
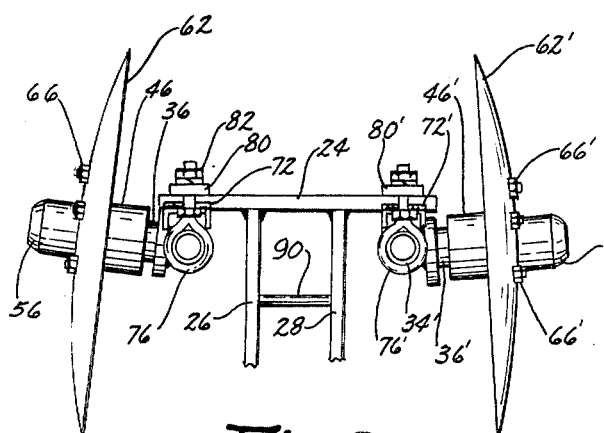
FIG. 3 is a top view of the disk means illustrating the disk spindles being secured forwardly of the transverse bar member.

It should also be noted that disk spindle assembly 32 nay be moved longitudinally on bar 24 by loosening nuts 2 and 84 to permit such movement. Additionally, the hannel member 68 may also be moved from a position earwardly of bar 24 (FIG. 4) to a position forwardly f bar 24 (FIG. 3). Such an adjustment permits the disks o be moved closer towards the knife 16 if so desired. n operation, the disk means 10 is free to pivot about in 30 and the weight of the assembly will cause the lisks 62 and 62' to dig into the ground to cause the earth o be thrown inwardly therefrom over the freshly injected itrogen. As previously stated, the angular relationship f the disks 62 and 62' may be changed by rotating pipes 4 and 34' with respect to bar 24 thereby increasing or lecreasing the amount of dirt that will be thrown thereby. The lateral adjustment of the disk spindle assemblies 2 and 32' also gives a great deal of versatility to the pparatus so that the fertilizer will be positively covered o prevent the escape from the ground thereof. The pindle, hub and associated bearings are also extremely mportant to this invention inasmuch as the design of the ame positively prevents foreign material from entering he interior thereof which obviously would decrease the ife thereof. The opposite ends of the hub are sealed to ositively prevent dirt or dust from entering the interior hereof which could cause damage to the bearing means nounted therein.

It should also be noted that one of the disk spindle ssemblies may be secured to the forward side of bar 24 vhile the other disk spindle assembly can be secured to he rearward side of bar 24. This relationship aids in leaning trash from the furrow where trash is present.

Disk means 10 may also be pivoted to the fertilizer nife if desired to trail therebehind which eliminates the ecessity of frame member 22. As seen in FIG. 3, a rod 0 is secured to the bottoms of bar members 26 and 28 nd extends therebetween. Rod 90 is provided to limit he pivotal movement of disk means 10 with regard to he implement and also provides a handle means to facili:ate the attachment of the disk means 10 to the implenent.

Thus, from the foregoing it can be seen that the device accomplishes at least all of its stated objectives.

Some changes may be made in the construction and arrangement of our disk means for a fertilizer applicator mplement without departing from the real spirit and purpose of our invention, and it is our intention to cover by our claims, any modified forms of structure or use of mechanical equivalents which may be reasonably included within their scope.

We claim:

1. In a disk means for a fertilizer applicator implement, comprising, a support means adapted to travel behind said implement, said support means includes a pair of spaced apart bar members having rearward and forward ends, a transverse bar member having rearward and forward sides, a substantially rectangular cross-sectional area, and being secured to and extending between rearward ends of said spaced apart bar members, extending outwardly of said spaced apart bar members, said spaced apart bar members being pivotally secured at their forward ends to said implement, and a pair of spaced apart disk assemblies operatively rotatably connected to said transverse bar member at the opposite ends thereof, each of said disk assemblies including a spindle means, a hub means rotatably mounted on said spindle means, a disk member secured to said hub means for rotation therewith, a vertically disposed pipe secured to one end of said spindle means and extending upwardly therefrom, and a securing means adapted to be selectively detachably secured to said transverse bar member, said securing means including, a vertically disposed elongated channel member having upper and lower ends, straight side portions, an open front portion and a back portion, said channel member being substantially the same length as the height of said transverse bar member and selectively detachably secured to said transverse bar member, said upper end having welded thereto an upper lip portion, said lower end having welded thereto a lower lip portion, said lip portions being adapted to detachably engage said transverse bar thereby preventing vertical movement of said channel member, an elongated U-shaped pipe segment of uniform cross-sectional area adapted to selectively rotatably receive throughout its entire length said vertically disposed pipe and having a convex back portion and a concave front portions, said front portion being of the same degree of curvature as the periphery of said vertically disposed pipe, said convex back portion being secured to said channel member side portions and extending into said open front portion of said channel member, said elongated U-shaped pipe segment being substantially the same length as said channel member, an elongated plate member being positioned on the side of said transverse bar opposite said channel member and having upper and lower ends and being spaced apart such that the distance between the nearest edges of said holes is greater than the height of said transverse bar, upper and lower eye bolts of equal length each having an eye end and a threaded end, said eye end of said upper eye bolt being spaced above said channel member and matingly engaging said vertically disposed pipe, said threaded end of said upper eye bolt extending horizontally across said transverse bar member and matingly engaging said upper hold of said plate member and having a nut threadably secured thereto, said eye end of said lower eye bolt being spaced below said channel member and matingly engaging said vertically disposed pipe, said threaded end of said lower eye bolt extending horizontally across said transverse bar member and matingly engaging said lower hole of said plate member and having a nut threadably secured thereto, wherein said vertically disposed pipe is selectively rotatably against said U-shaped pipe segment, and said channel members being adapted to be selectively positioned at either of the forward or rearward sides and selectively along said transverse bar member thereby permitting said disk assemblies to be moved forwardly and rearwardly with respect to said implement and further permitting said disk assemblies to be staggered with respect to each other so that one disk assembly will be positioned forwardly of the other disk assembly.

2. The disk means of claim 1 wherein first and second bearing means embrace said bearing surfaces, a first seal means between said spindle and said hub means at the inward end thereof, a nut means threadably secured to said spindle at its outward end and operatively engaging said second bearing means, a dust cap frictionally engaging said hub at the outward end thereof, said hub having inward and outward open ends wherein said inward end is larger in diameter than said outward end and said hub further having a flange extending therefrom, wherein said flange is positioned in the approximate center of said hub and extends radially outward therefrom, said disk member embracing said hub means and being secured to said flange, said bearing means being tapered roller bearings.

3. The spindle means of claim 1 comprised of a circular base portion secured to said vertically disposed pipe, a shoulder portion secured to said base portion and extending horizontally outward therefrom, and a tapered spindle portion secured to said shoulder portion and extending horizontally outward from said shoulder portion completely through said hub, said spindle portion having opposite inward and outward ends wherein said inward end is of greater diameter than said outward end, said spindle portion also having horizontally disposed bearing surfaces adjacent each of said opposite ends, said base portion being of substantially greater diameter than said spindle portion.

References Cited

UNITED STATES PATENTS

| | | | |
|---|---|---|---|
| 1,360,801 | 11/1920 | Runyans | 172—603 |
| 2,003,831 | 6/1935 | Glaves | 172—603 |
| 2,698,565 | 1/1955 | Carney | 172—574 |
| 2,757,596 | 8/1956 | Adels | 172—603 |
| 2,771,044 | 11/1956 | Putifer | 111—85 |
| 2,963,998 | 12/1960 | Bliss | 111—85 |
| 3,306,241 | 2/1967 | Copple | 111—7 |

ROBERT E. PULFREY, Primary Examiner

A. E. KOPECKI, Assistant Examiner

U.S. Cl. X.R.

111—85; 172—601; 301—132